March 3, 1959     F. C. ALBRIGHT     2,875,855
WHEEL AND BRAKE ASSEMBLY FOR AIRCRAFT LANDING GEAR
Filed Sept. 28, 1953     4 Sheets-Sheet 2

INVENTOR.
FRANKLIN C. ALBRIGHT
BY
ATTORNEY

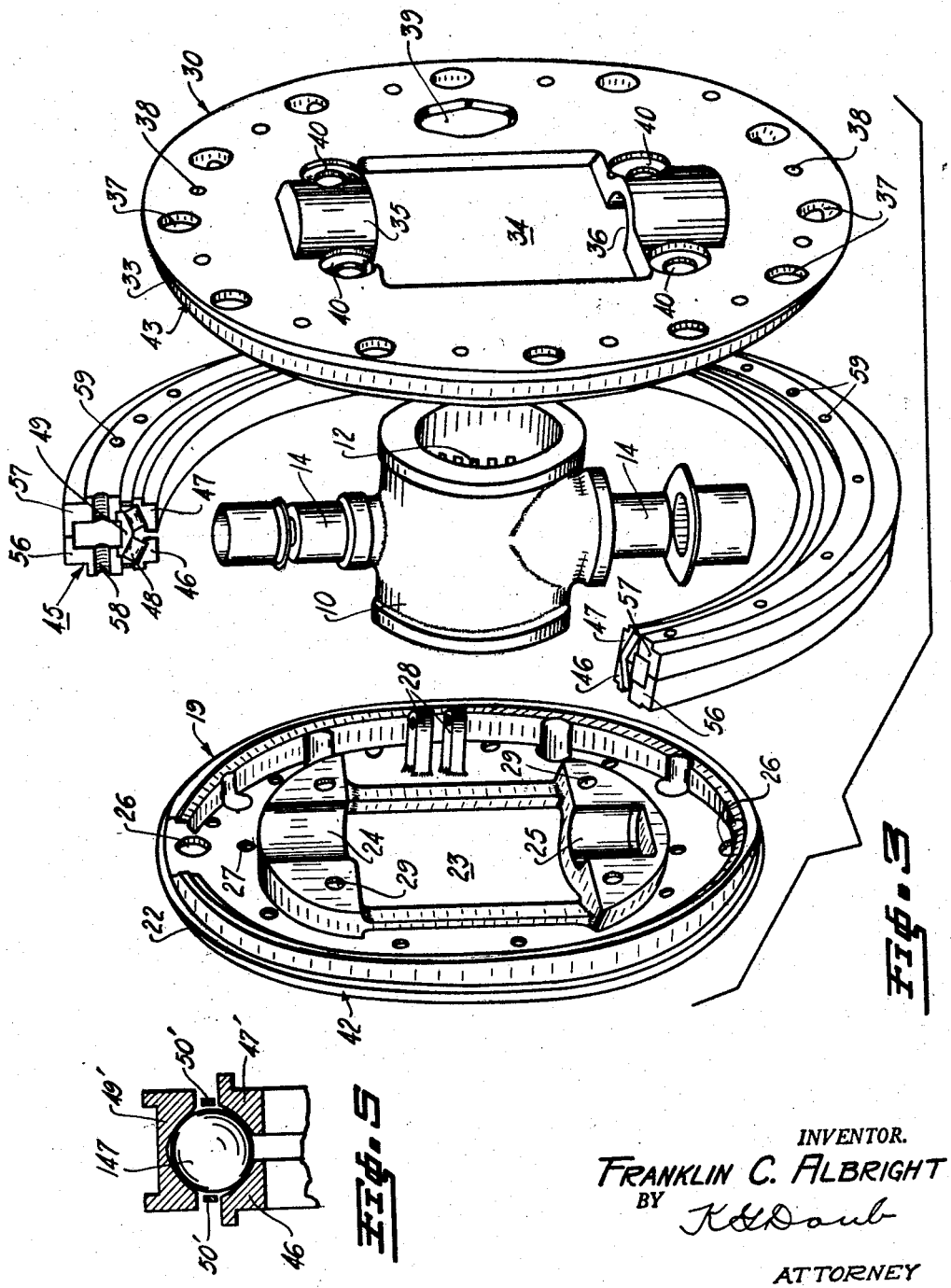

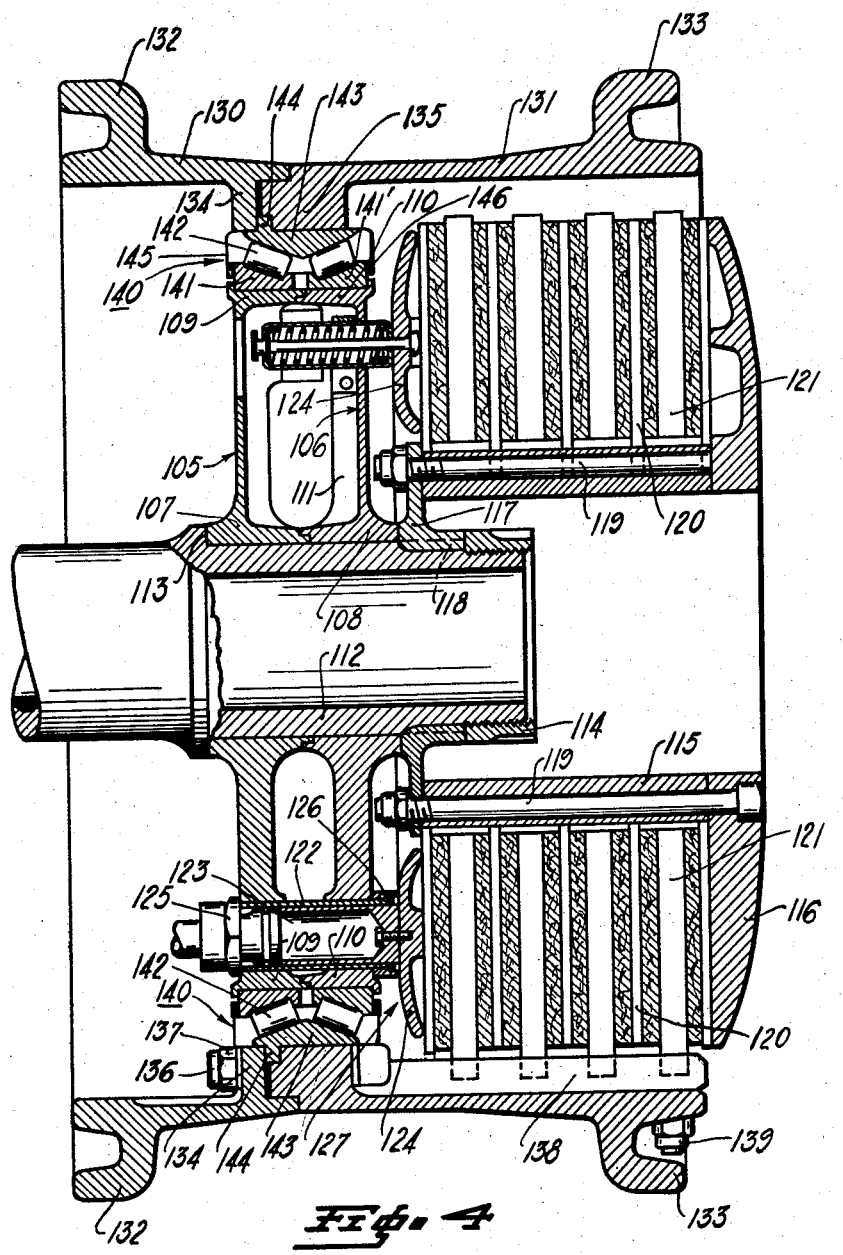

United States Patent Office 2,875,855
Patented Mar. 3, 1959

2,875,855

WHEEL AND BRAKE ASSEMBLY FOR AIRCRAFT LANDING GEAR

Franklin C. Albright, South Bend, Ind., assignor to Bendix Aviation Corporation, South Bend, Ind., a corporation of Delaware Application September 28, 1953, Serial No. 382,673

7 Claims. (Cl. 188—18)

This invention relates to a wheel and brake assembly primarily adapted for use with landing gear for aircraft. A wheel and brake assembly of the kind with which the instant invention is concerned usually employs brake mechanism of the disc type with one set of discs (the stator discs or elements) fixed on a non-rotatable wheel and brake carrier and the other set (the rotatable discs or elements) fixed to an outer or peripheral rotatable tire-carrying wheel structure, as in the Patent to DuBois No. 2,616,525, granted November 4, 1952, to the assignee of the instant invention.

An object of the invention is to effect a reduction in weight of a wheel and brake assembly for heavy duty service, as in aircraft landing gear, while at the same time maintaining the necessary strength to sustain the heavy vertical, lateral and angular load stresses to which the wheel may be subjected. This object is, in part, accomplished by designing the parts of the wheel so that they may be readily forged in contradistinction to casting, although the parts may be either forged or cast as desired. An important advantage in forging is that the parts may be reduced in weight while maintaining the necessary strength and yet at the same time may be readily machined to close tolerances.

Another object is to provide an improved wheel and brake assembly having large wheel bearings located on the periphery of a central brake carrier and a wheel supporting member capable of resisting heavy load stresses and moments due to side loads commonly encountered by wheels used in aircraft landing gear.

Another object is to provide in a wheel of the type specified a rugged and compact non-rotatable wheel body having improved means for mounting the brake torque components at either one or both sides of the body.

Another object is to provide a wheel having a non-rotatable wheel body which is of a diameter approaching the overall diameter of the wheel, and in conjunction therewith a bearing assembly and a pair of wheel halves which constitute the rotatable tire-mounting wheel proper, the arrangement being such as to permit demounting of one of the wheel halves without disturbing the bearing assembly.

A further object of the invention is to provide a wheel and brake assembly wherein maximum installation space for the required braking components is provided within the vertical planes of the wheel, at the inboard or outboard side thereof, which ever may be found more convenient. This is brought about by a particular type of wheel-supporting body and wheel bearing which occupy a minimum of space transversely of the wheel and at the same time are so braced against load stresses as to permit the body to be offset varying degrees with respect to the peripheral wheel halves which constitute the rotatable tire-carrying part of the wheel.

A still further object of the invention is to provide a wheel and brake assembly well adapted to a "casteerable" wheel, viz., a wheel which may be freely castered or steered, as requirements dictate.

The foregoing and other objects and advantages will become apparent in view of the following description taken in conjunction with the drawings, wherein:

Figure 3 is an exploded or disassembled view of the wheel body components and bearing assembly;

Figure 4 is a cross-sectional view of a modified form of a wheel, and

Figure 5 is a sectional detail of a modification of the wheel bearing assembly.

Figure 1:
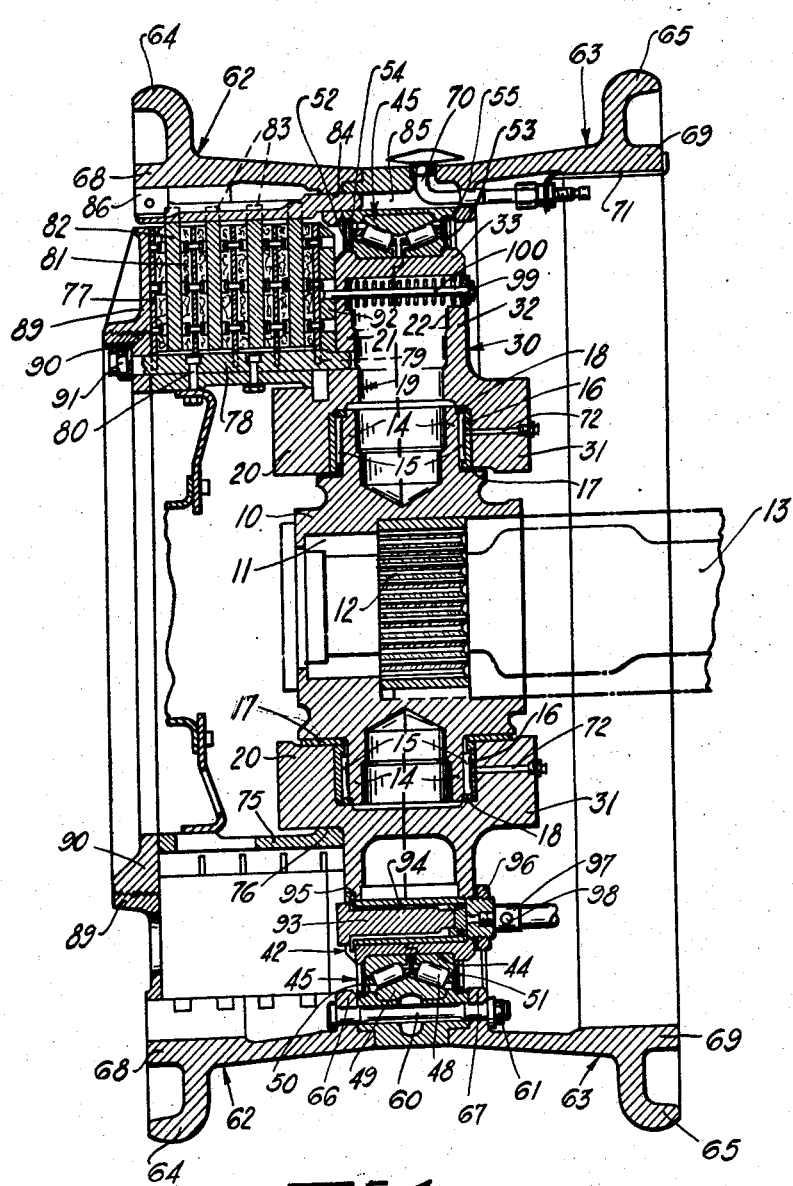
Figure 1 is a substantially central cross-sectional view through a brake and wheel assembly according to the invention.
Figure 2:
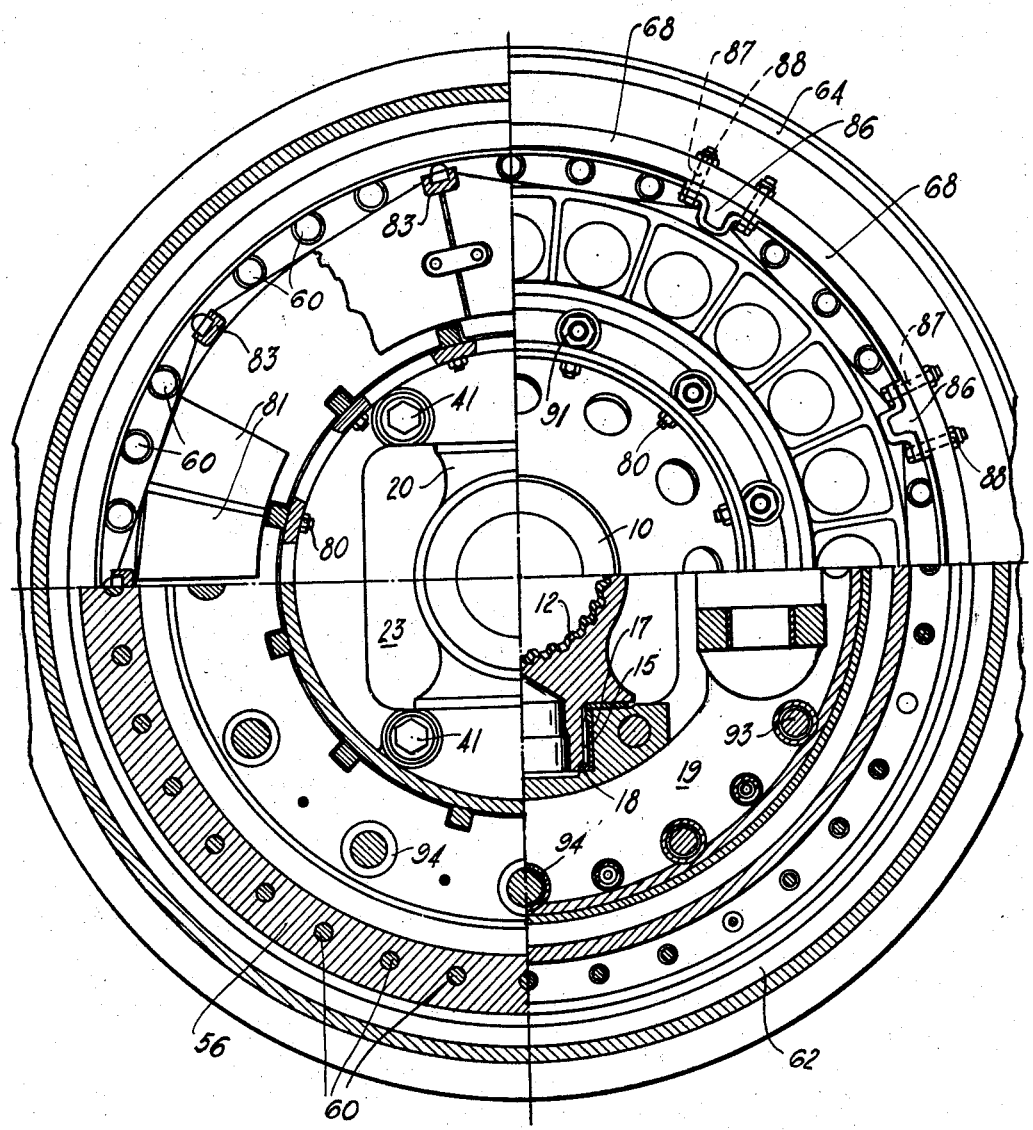
Figure 2 is a view in sectional side elevation of Figure 1.

Referring to the drawings and first to the wheel and brake assembly as shown in Figures 1, 2 and 3 thereof, a hub section is indicated at 10; it is formed with an axle opening 11, the inner wall of which is splined, as at 12, to receive the axle 13 of a landing gear strut, not shown. Projecting radially from the hub at diametrically opposite points are a pair of hollow king pins or swivel posts 14, adapted to receive a bearing assembly, here shown as of the straight roller or pin type comprising a series of rollers 15, races 16, shims 17 and retainers 18.

The supporting structure for both the rotating wheel proper (the wheel halves to be described) and the non-rotatable stator elements of the brake assembly consists of a pair of disc-shaped members or plates 19 and 30, compare Figures 3 and 1. Plate 19, which may be considered the outer plate in a castering wheel, is formed with an annular axially-projecting reinforcing and brake supporting boss or thickened portion 20, and a radially-extending disc-shaped relatively thin section or portion 21, which at its outer edge terminates in an axial-extending bearing-supporting flange 22. The central area of the plate is formed with a rectangular opening 23, which fits over the hub 10, and a pair of oppositely-extending depressions 24 and 25, which form one-half of a pair of sockets for the king pins or swivel-posts 14 and the bearings therefor. Adjacent the flange 22 are a plurality of annularly-spaced holes 26, for receiving the inner ends of a series of hydraulic brake cylinders 94, which latter also function as clamping members or bolts. The holes 27 accommodate brake-return spring bolts 100. Also formed on the inner surface of the plate 19 is a pair of hinge or swivel lugs 28, which provide means for attaching a damping mechanism, to prevent shimmy of the wheels, if it should become a problem. The four holes 29 located in the thickened portion 20 around the central opening 23 receive clamping bolts 41.

The wheel-supporting disc or plate 30, which may be considered the inner plate in a castering wheel, has a central axially-projecting thickened reinforcing portion 31, from which projects a radial disc-shaped relatively thin section 32, which at its outer edge terminates in an axially-extending bearing-supporting flange 33, adapted to mate with the flange 22 of the plate 19. The central area of the plate 30 is formed with a rectangular opening 34, to accommodate the hub 10. A pair of oppositely-extending depressions 35 and 36, mate with the depressions 24 and 25 respectively in plate 19 and complete the sockets for the king pins or swivel posts 14 and the bearings therefor. The holes 37 and 38 in plate 30 match with the holes 26 and 27 in plate 19 to receive the hydraulic cylinders 94 and spring bolts 100. The lugs 28 extend through opening 39. The four holes 40 located in the thickened portion 31 around the central opening 34 mate with the holes 29 in plate 19 to accommodate the clamping bolts 41.

When the wheel-supporting plates 19 and 30 are matched and clamped together in assembled relation as shown in Figure 1, the peripheral flanges 22 and 33 thereof in conjunction with the peripheral edges 42 and 43 of the plates define an annular channel 44, which receives the inner race components of a bearing assembly generally indicated at 45, said inner race components being provided in the present instance by a pair of matched rings 46 and 47. A series of bearing rollers 48 are disposed in opposed angular relation in the race defined by the rings 46 and 47 in conjunction with an outer race ring 49, the angle at which said rollers are mounted being such as to most effectively receive and transmit the vertical, lateral and angular load thrusts or moments to the wheel supporting plates 19 and 30 and the hub section 10 with a minimum of friction. Bearing cages 50 and 51 are provided for the rollers 48, the latter being disposed in openings formed in said rings, as is common in bearing assemblies. Bearing seal plates 52 and 53, held in place by retainer rings 54 and 55, and wheel spacer and runner rings 56 and 57, prevent escape of a lubricant and protect the bearing from dust and dirt and other abrasives. The bearing is permanently packed with a suitable lubricant, but should repacking become necessary, either one or both spacer runners 56 and 57 and plates 52 and 53 may be removed for that purpose when either one or both of the wheel halves is or are demounted in a manner which will presently become apparent.

The spacer and runner rings 56 and 57 are shaped or contoured and matched in a manner such that when they are assembled on the outer bearing race ring 49, they define an annular channel or seat 58 for the latter ring; and they are also provided with a series of bolt holes 59, adapted to receive wheel clamping bolts 60, which are secured by lock nuts 61.

The rotatable tire-carrying portion of the wheel comprises a pair of matched wheel halves, generally indicated at 62 and 63. As will be understood, these wheel halves or members are in effect rim sections for mounting a tire, and accordingly are provided with side flanges 64 and 65 which together with the transverse body portions of the wheel halves are contoured to define a seat for a demountable tire of the desired specifications as to overall diameter and cross-section. At their inner edges, the wheel halves are formed with radially-inwardly-extending clamping flanges 66 and 67, which together with the inner transverse edge portions of said wheel halves define annular inner and outer seats adapted to clampingly engage the wheel spacer and runner rings 56 and 57, the said flanges being formed with a series of bolt holes for the bolts 60. At their outer edges the wheel halves are projected transversely and terminate in flanges 68 and 69. Provision is made for a tire valve 70, which at its outer end is supported from the flange 69 by a bracket 71. The members indicated at 72 are lubricating nipples for the king pin roller bearings 15.

BRAKE ASSEMBLY

A brake carrier or drum is indicated at 75; it is in the form of a circular member which at its inner edge portion is pinned, as at 76, to the thickened portion 20 of the inner side plate 19. A series of stator plates or discs 77 are mounted on the drum 75 by means of keys 78, which at their inner ends project into openings or slots 79, formed in the wheel supporting plate 19. The keys 78 have squared body portions which define transverse slots for slidably receiving the inner edge portions of the stator discs 77, said body portions being anchored to the drum 75 by means of bolts 80. The discs 77 are faced with friction or brake material 81, which may be of any type found suitable or desirable, the material in this instance being shown as riveted to said discs. The rotating friction elements of the brake assembly consist of a series of segments 82, which at their radially outer ends or edges are slidably received in transverse slots provided by keys 83, the latter at their inner ends projecting through openings 84 formed in the flanges 66 of the wheel half 62, and into holes 85 formed in the adjacent spacer ring 56. At their outer ends the keys 83 terminate in yoke or U-shaped portions which are pinned to anchor blocks or key fittings 86, connected to the wheel flange 68 by means of bolts 87 and lock nuts 88. A non-rotatable reaction member or backing plate 89 is mounted on the outer side of the extreme left-hand stator disc and is held in place by adapter 90, the latter in turn being anchored by the screw-threaded outer ends of the keys 78, which project through openings in the adapter 90 and are provided with lock nuts 91. The adapter 90 and backing plate 89 are screw threaded to facilitate assembly operations.

A laterally-movable pressure plate is indicated at 92; it is adapted to be moved to braking position by means of pistons 93, mounted in hydraulic cylinders 94, the latter also functioning as securing means or bolts for the inner and outer wheel-supporting plates 19 and 30. For this purpose, the inner ends of the hydraulic cylinders 94 are formed with flanges 95, which seat in counter-sunk holes or openings formed in the wheel-supporting plate 19, and at their outer ends the said cylinders project through holes or openings formed in the wheel-supporting plate 30 and are screw-threaded to receive securing nuts 96. Hydraulic fluid under pressure is supplied to the cylinder 94 by means of suitable fittings 97 and line connections 98.

The pressure plate 92 and the pistons 93 are urged toward released or retracted position by means of a plurality of annularly-spaced return springs 99, which are mounted on the bolts 100.

ASSEMBLY AND OPERATION

Obviously, different methods of assembly may be adopted. However, one procedure is to mount the inner and outer wheel supporting disc or plates 19 and 30 to the hub and king pin section 10, 14 with the assembled outer bearing and wheel runner assembly 45 located on the flanges 22 and 33. The inner and outer wheel halves 62 and 63 may then be mounted to the spacer and bearing assembly and secured in place by the bolts 60 and nuts 61. The hydraulic fluid connections including the cylinder 94 and pistons 93 may be mounted in the holes provided therefor in the inner and outer wheel supporting plates 19 and 30; after which the brake drum or carrier 75 may be secured in place on the lateral projection 20, the stationary brake components 77 and the rotating segments 82 then assembled in the slots provided therefor by the keys 78 and 83, and the backing plate 89 and adapter 90 mounted and secured in place by the nuts 91.

In operation, the only parts of the wheel which rotate are the wheel halves 62 and 63, the spacer and runner rings 56 and 57 and outer bearing race 49, and the brake rotor elements 82.

In mounting or demounting a tire, the wheel half 63 may be removed without removing the bearing and spacer assembly 45 or any part thereof.

It will be noted that the main parts of the wheel are so designed as to facilitate forging. This is true of the hub and king pin section 10, 14, the wheel supporting plates 19 and 30, the spacer and bearing assembly 45, the inner and outer wheel halves 62, 63, and most of the brake components including the drum 75, pressure plate 92, backing plate 89 and adapter 90. However, the wheel and brake components are also adapted for casting in whole or in part, whichever may be found more suitable for manufacturing purposes.

Figure 4

Figure 4 illustrates a wheel of the non-swivel type embodying features of the invention. In this instance the plates which provide the non-rotatable wheel-supporting body are indicated at 105 and 106. For the purposes of description, it will be assumed that the plate 105 is the inner plate and the plate 106 the outer plate, although this order could be reversed for convenience or to suit different installations. The plates are formed with integral mating hub sections 107 and 108 and transverse mating flanges 109 and 110 on the opposed contiguous faces thereof. If desired, the plates 105 and 106 may also be formed with reinforcing ribs, as at 111. At the hub portion of the wheel body, the plates 105 and 106 are connected or clamped together by an axle or hub member, shown in the form of a hollow bushing 112, having a shoulder 113 at one side of the wheel against which the hub section 107 abuts when the plates and hub member are assembled and secured in assembled relation as by lock nut 114. The one end (the right-hand end in Figure 4) of the hub member 112 is extended sufficiently to provide a support for the brake carrier, here shown in the form of a torque tube 115 and associated backing or reaction plate 116. For this purpose, a carrier ring 117 is splined on the hub member 112 as at 118, and is locked in place by tightening the nut 114. The ring 116 is provided with a plurality of annularly-arranged bolt holes, to accommodate the inner threaded ends of stator keys 119, by means of which the stator segments or discs 120 as the case may be, are locked against rotation to the tube 115 while at the same time are permitted to move axially thereon to be brought into frictional or braking engagement with a series of rotor discs or elements 121, supported by the rotating or tire-carrying portion of the wheel in a manner to be described.

As in the wheel illustrated in Figures 1 to 4 inclusive, the wheel supporting plates are secured or clamped together by the hydraulic piston or motor cylinders, here indicated at 122, in which are mounted pistons 123, connected to a pressure plate 124. The outer ends of said cylinders are provided with threaded brake line fittings 125, and the opposite ends thereof with clamping and lock nuts 126. The device indicated at 127 functions to take up space between the rotor and stator elements resulting from wear or disintegration of the brake material; it is not concerned with the invention and hence need not be described.

The wheel halves which constitute the rotary tire-carrying portion of the wheel are indicated at 130 and 131; they are of different transverse widths in order to have the wheel body offset with respect to the geometrical center line of the wheel and thus provide more space at one side of said body within the vertical planes of the wheel for the brake assembly. Accordingly, the wheel half 131 is of materially greater transverse extent than the wheel half 130. Each wheel half is formed with a tire-retaining bead or flange, as at 132 and 133, and also with a radially-inwardly extending mounting flange, as at 134 and 135, the latter being provided with bolt holes for receiving clamping bolts 136, secured in place by lock nuts 137. The rotor brake discs or elements are carried by the wheel half 131, being connected for axial movement to the latter by keys 138, which at their inner ends are anchored to the flange 135 and at their outer ends are secured to the adjacent edge of the wheel half by bolts 139. These keys define axially-extending slots for the outer edges of the rotor discs in a manner well understood in the art.

The annular bearing ring assembly for the wheel halves is in general like that shown in the wheel first described. It is generally designated at 140 and comprises inner race rings 141 and 141', which are seated on the wheel-supporting plate flanges 109 and 110, a series of bearing rollers 142, and an outer race or runner ring 143 having an annular radial projection 144, which is clamped or locked between the flanges 134 and 135. Cover plates 145 and 146 protect the bearings from infiltration of abrasives.

The rugged construction of the supporting means for the bearings provided by the flanges 109 and 110 and adjacent peripheral portions of the plates 105 and 106, and the particular arrangement of the inner and outer race and runner rings in conjunction with the bearing elements enable the wheel to withstand heavy vertical, lateral and angular load thrusts even though the wheel-supporting body is materially offset with respect to the vertical load center of the wheel. By offsetting the wheel-supporting body with respect to the rotating wheel halves, more space is made available for installation of a brake assembly of ample braking capacity without widening the wheel beyond the vertical planes of the tire-carrying portion of the wheel. As in the wheel first described, the parts may be readily forged, since hollow and deeply drawn formations are defined by separately fabricated parts which, prior to mating, are open and adaptable for contouring in forging dies.

Figure 5 illustrates how the bearing race assembly 45 of Figures 1, 2 and 3, or by a slight modification the like assembly 140 of Figure 4, may be adapted for ball bearings instead of roller bearings. In this instance the radially outer race ring is indicated at 49'; the radially inner race rings at 46' and 47'; the bearing cage at 50', and the ball bearings at 147. Here, as in the roller bearing assemblies of Figures 1 to 4, inclusive, the bearing is well adapted to withstand radial, lateral and angular load stresses.

Although only two embodiments of the invention have been illustrated and described, it will be understood by those skilled in the art that the objects thereof may be attained by the use of constructions differing in certain respect from those disclosed without departing from the underlying principles of the invention.

I claim:

1. A wheel and brake assembly comprising a pair of non-rotatable annular wheel-supporting plates having laterally extending mating projections on the opposed contiguous faces thereof, a combined connecting means and hydraulic actuating means consisting of a plurality of circumferentially spaced cylinders constructed as clamping members to hold the wheel supporting plates together, said spaced cylinders being formed with cylinder bores therein, a plurality of pistons slidably received in said cylinder bores for movement therein, and fluid pressure transmitting means for communicating fluid pressure to actuate said pistons whereby the brake is applied, one or more non-rotatable braking elements supported for axial movement on the outer side of one of said plates, wheel bearing means mounted on the peripheral portions of said plates, wheel halves connected to said bearing means and constituting the rotatable tire-carrying portion of the wheel, one or more axially movable rotatable braking elements supported for axial movement by one of said wheel halves and arranged to coact with said non-rotatable braking elements, a pressure plate for said braking elements also supported for axial movement on the outer side of said one of said plates, and pistons mounted in said cylinders and arranged to engage said pressure plate.

2. A wheel assembly including a pair of non-rotatable annular wheel-supporting plates having mating portions on the contiguous faces thereof in the radially outer regions of said plates, means rigidly connecting said plates together with said projections in mated relation providing a non-rotatable wheel-supporting body, a continuous bearing ring assembly including a non-rotatable race ring mounted on said projections and a rotatable runner ring arranged circumferentially of said race ring radially outwardly beyond the peripheries of said plates, a pair of wheel halves having their transverse inner contiguous edges in clamping engagement with said runner ring and lying in substantially the same transverse plane as the latter, said wheel halves together with said runner ring constituting the rotatable tire-carrying portion of the wheel, and means for swiveling the wheel assembly through combination with said wheel supporting plates.

3. A wheel assembly including a pair of generally disc-shaped plates having mating flanges on the contiguous faces thereof in the peripheral regions of the plates, means rigidly connecting said plates together with said flanges in mated relation providing a non-rotatable wheel-supporting body, a pair of wheel halves mounted circumferentially of said plates, a bearing assembly for said wheel halves comprising a non-rotatable race ring supported on said flanges between the spaced peripheral portions of said plates and a rotatable runner ring arranged circumferentially of said race ring and having its opposite edges mating with the contiguous edges of said wheel halves, the circumferential surfaces of said wheel halves and runner ring lying in substantially the same transverse plane, and means swivelably mounting said wheel-supporting body.

4. A wheel assembly including a pair of disc-shaped annular non-rotatable wheel-supporting plates having mating portions on the contiguous faces thereof, a pair of wheel halves rotatably mounted circumferentially of said plates, a bearing assembly for said wheel halves comprising a non-rotatable race ring disposed between the peripheral portions of said plates and a rotatable runner ring arranged circumferentially of said race ring radially outward beyond the peripheral edges of said plates, the radially inner surfaces of said wheel halves being provided with radially inwardly-extending projections straddling said runner ring, means projecting through said last named projections and runner ring for clamping the wheel halves and runner ring together to provide the rotatable tire-carrying portion of the wheel, a pivot post extending between said wheel halves, and means clamping said wheel halves to said post and permitting relative rotational movement therebetween.

5. A wheel assembly including a pair of disc-shaped annular non-rotatable wheel-supporting plates having mating flanges on the contiguous faces thereof, a pair of wheel halves rotatably mounted on said plates, a bearing assembly for said wheel halves comprising a race ring disposed between the peripheral portions of said plates, a rotatable runner ring mounted circumferentially of said race ring radially outward beyond the peripheral edges of said plates, the radially inner faces of said wheel halves being formed with radially inwardly-extending flanges straddling said rotatable runner ring, fastening means projecting through said flanges and runner ring for clamping the wheel halves together to provide the rotatable tire carrying portion of the wheel, the outer surfaces of said wheel halves and said runner ring lying in substantially the same transverse plane, a pivot post received between said plate, and means allowing pivotal movement between said post and supporting plates.

6. A wheel assembly for a caster type of wheel including a pair of generally disc-shaped plates having laterally-extending mating projections on the opposed contiguous faces thereof in the peripheral regions of the plates, a wheel hub member provided with opposed axially-extending swivel posts, said wheel supporting plates also having formed in the opposed contiguous faces thereof mating depressions providing swivel bearings for said posts, a pair of wheel halves mounted circumferentially of said plates, and a bearing assembly for said wheel halves mounted on the spaced peripheral portions of said plates.

7. A wheel and brake assembly comprising a pair of annular non-rotatable disc-like supporting plates having laterally-extending mating flanges on the contiguous faces thereof within the peripheral region of said plates, means rigidly connecting said plates together with said flanges in mated relation to provide a non-rotatable wheel-supporting body, a disc brake assembly comprising a plurality of non-rotatable radially-extending axially-movable braking elements, means anchoring said braking elements to a laterally-projecting portion of one of said plates, a continuous bearing ring assembly including a non-rotatable race ring mounted on said flanges and a rotatable runner ring arranged circumferentially of said race ring radially outwardly of the peripheries of said plates, a pair of wheel halves having their inner edge portions connected to said runner ring, one or more rotatable braking elements, means connecting said latter elements to one of said wheel halves for axial movement in between said non-rotatable braking elements, a backing or reaction plate and an axially-movable pressure plate disposed respectively on the outer and inner sides of said braking elements, a combined connecting means and hydraulic actuating means consisting of a plurality of circumferentially spaced cylinders constructed as clamping members to hold the wheel supporting plates together, said spaced cylinders being formed with cylinder bores therein, a plurality of pistons slidably received in said cylinder bores for movement therein, and fluid pressure transmitting means for communicating fluid pressure to actuate said pistons whereby the brake is applied.

References Cited in the file of this patent
UNITED STATES PATENTS

| | | |
|---|---|---|
| 1,804,600 | Edson | May 12, 1931 |
| 2,417,855 | Barish | Mar. 25, 1947 |
| 2,446,699 | Garnett et al. | Aug. 10, 1948 |
| 2,486,144 | Frank | Oct. 25, 1949 |
| 2,616,525 | Du Bois | Nov. 4, 1952 |
| 2,649,922 | Hutchinson et al. | Aug. 25, 1953 |
| 2,671,532 | Du Bois | Mar. 9, 1954 |
| 2,672,220 | Collier | Mar. 16, 1954 |